United States Patent [19]

Gildersleeve

[11] Patent Number: 5,659,924
[45] Date of Patent: Aug. 26, 1997

[54] GROMMET WITH FLEXIBLE SEALING PASSAGE

[75] Inventor: Roy Gildersleeve, Farmingham, Mich.

[73] Assignee: Chemcast Corporation, Madison Heights, Mich.

[21] Appl. No.: 188,084

[22] Filed: Jan. 28, 1994

[51] Int. Cl.$^6$ ............................................. F16L 5/00
[52] U.S. Cl. ................................................... 16/2.1
[58] Field of Search .......................... 16/2, 3; 174/152 R, 174/152 A, 153 A, 153 G

[56] References Cited

U.S. PATENT DOCUMENTS

| | | | |
|---|---|---|---|
| 4,081,879 | 4/1978 | Rubright | 16/2 |
| 4,229,010 | 10/1980 | St. Laurent | 277/30 |
| 4,784,285 | 11/1988 | Patel | 220/307 |
| 5,353,472 | 10/1994 | Benda et al. | 16/2 |

*Primary Examiner*—Chuck Y. Mah
*Attorney, Agent, or Firm*—Lalos & Keegan

[57] ABSTRACT

A grommet for sealing an opening in a panel such as the firewall of an automobile having a sealing passageway for engaging a member passing through the panel and being supported by the grommet. A base portion of the grommet is made from a softer and more resilient material having a durometer hardness in the range of 20 to 90 Shore A. A harder portion of the grommet which forms a locking element, a wing and an axially extending sealing surface has a durometer hardness in the range of 40 to 90 Shore D. The grommet seals to the panel and to the member passing through the grommet and panel.

8 Claims, 2 Drawing Sheets

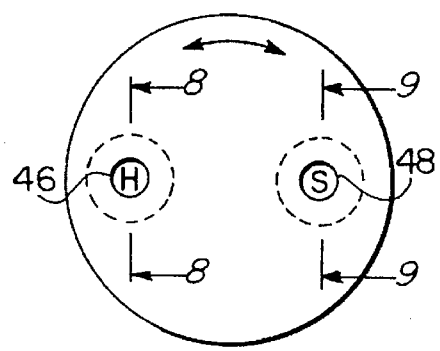
FIG. 7
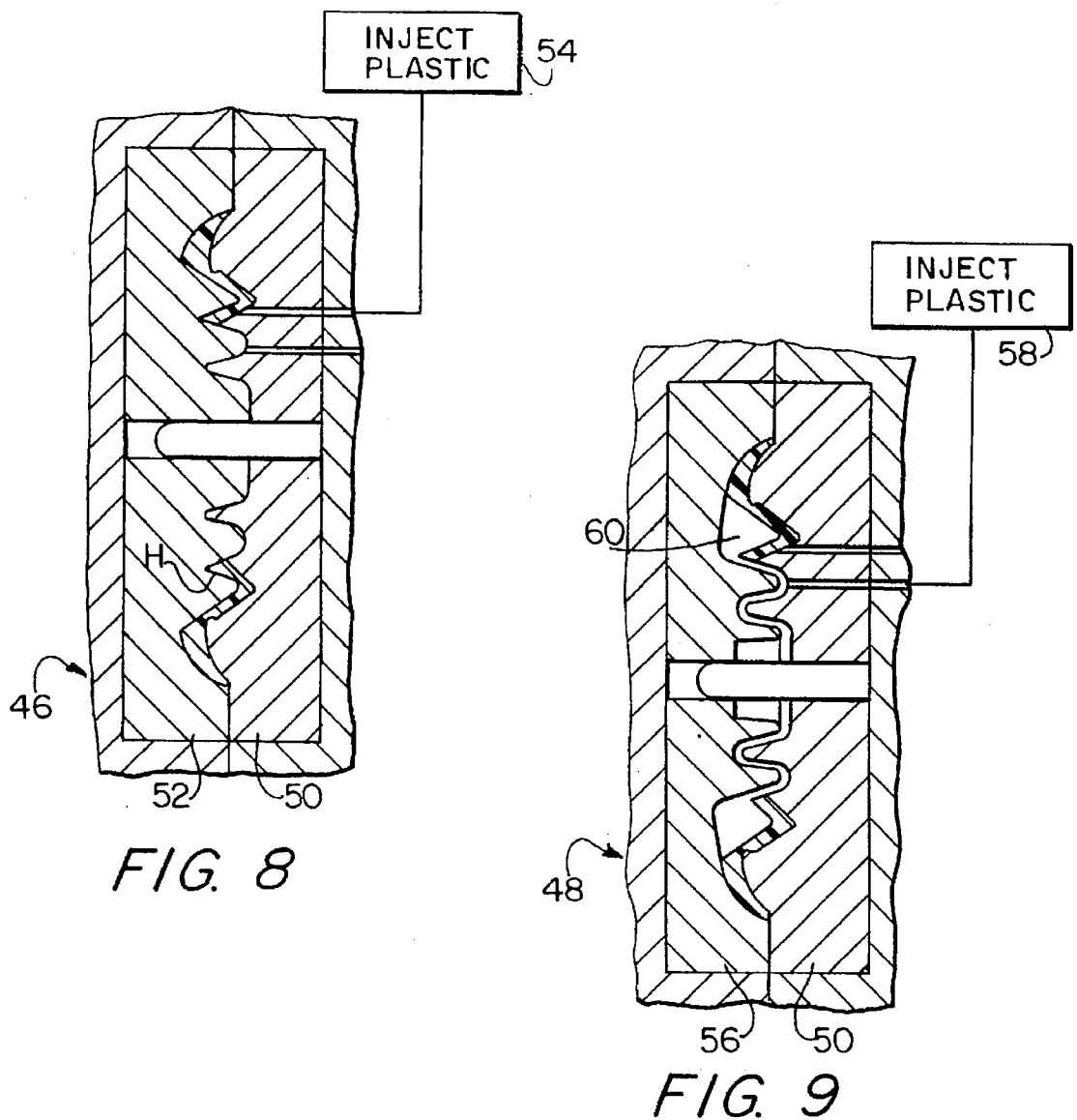
FIG. 8
FIG. 9

GROMMET WITH FLEXIBLE SEALING PASSAGE

This application is related to commonly assigned patent application Ser. No. 07/925,777 filed Aug. 7, 1992, now abandoned.

FIELD OF THE INVENTION

This invention relates to a member for sealing an opening in a panel. More particularly, it relates to a grommet having a sealing passageway for receiving a member to be supported by the grommet.

BACKGROUND OF THE INVENTION

The device of this invention is used for plugging an opening in a panel and for supporting a member that is being passed through the panel usually in a vibration isolation and sealing mode. They are widely used in control panels and in panels separating various functioning parts of a machine. They find wide use in the automotive industry to position, support and seal various members such as wires, conduits, cables, rods or the like, which extend through the firewall or floor panel of the passenger compartment of the vehicle.

When an access hole in a panel is provided for assembly purpose or for tool access for attachment of other components to the panel, it has been common to use metal plug stampings for covering the holes, and these plugs can be fastened in various ways such as by the use of hot melt adhesives, by welding or brazing, or by the use of fasteners such as screws and the like.

When a grommet is used not only to seal the opening in the panel but also to sealingly pass a member through the panel, it has been common to fabricate the grommet with a metal insert embedded into an elastomeric body so that a portion of the insert can be deformed to hold the grommet to the panel while the elastomeric portion seals the grommet to the panel and also seals the member passing through the grommet to the grommet itself. Typical examples of this type of grommet are shown and described in U.S. Pat. Nos. 3,182,119 and 3,654,382.

U.S. Pat. Nos. 4,784,285 and 4,885,121 disclose a plug structure known as a dual durometer self-locking and sealing plug, and the method of making such a plug, respectively. While there is no teaching of the formation of a grommet which is the subject matter of the present invention, the molding methods of forming this plug are applicable to a grommet as well as a plug and serve as an improvement over molding methods shown and discussed in U.S. Pat. No. 4,081,879. U.S. Pat. No. 4,081,879 teaches the formation of a grommet or a plug which has an annular hard locking portion coupled with a softer sealing plastic portion which also serves as the panel opening covering. In U.S. Pat. Nos. 4,784,285 and 4,885,121, the method of forming the sealing plug includes the steps of, first, injection molding a harder annular locking portion and then injection molding the softer sealing portion in contact with the harder locking portion which remains in a portion of the injection mold. This sequential injection molding technique provides a preferred method of making the grommet of the present invention, although, sequential spraying or pouring into molds can be used as an alternative.

U.S. Pat. No. 4,081,879 presents an improvement over the composite metal and elastomeric grommets shown in U.S. Pat. Nos. 3,182,119 and 3,654,382. The principle of the '879 patent is embodied in the grommet of the present invention. The required strength and hardness that was supplied by the metal insert of the former grommets has been replaced by a plastic material having the requisite hardness to make the plug self-locking and resistant to dislodgement and impact, while also providing penetration resistance over the range of temperatures to which it is exposed. The sealing portion is made from a softer material which is chemically compatible with the hard material, having a requisite resilience to permit sufficient deformation when pressed against the inner periphery of the opening to facilitate insertion of the grommet into the opening and to provide the required sealing between the resilient peripheral portion and the inner peripheral portion of the panel as well as sealing the member being inserted through the panel. The hard locking and softer sealing plastic materials disclosed in the '879 patent are thermoplastic or thermosetting resins or mixtures thereof which can be cast as plastisols such as vinyl, and preferably a polyvinyl chloride. The grommet is formed by the sequential spraying method previously mentioned. The hard locking portion is an annular ring and the central, hole filling portion is a softer vinyl body portion which includes a flexible snout having a central opening to support the wire, rod or other member which extends through the panel opening. This snout has enough flexibility to yield or stretch and sealingly engage the member but the snout direction is fixed along the axis of the grommet. Thus the member must be pushed through the grommet at substantially a right angle to the panel, and skewing or misalignment makes the assembly difficult or impossible to accomplish. Also with the '879 grommet and the other prior art grommets discussed above, there can be no axial movement of the inserted member relative to the panel or periphery of the grommet after installation.

SUMMARY OF THE INVENTION

The grommet of the present invention has all the advantages of the so-called "dual durometer" self-locking and self-sealing grommet taught in U.S. Pat. No. 4,081,879 but with the added advantages provided by the invention of patent application Ser. No. 07/925,777 in the form of a central grommet portion which flexibly mounts a member engaging sealing passageway for generally universal, radial and axial movement. This central grommet portion has a convoluted configuration which allows complete flexibility in alignment of the wire, cable, rod, lever or other member to facilitate assembly and allow axial movement in use, if needed; for example, an actuating lever movement can be transmitted through the grommet.

A unique advantage of the present invention is that the softer material extends into the interior of the locking portion of the device to permit the locking portion to flex more easily, thus facilitating insertion of the locking portion through the opening in the panel.

The grommet of the present invention seals an opening in a panel and is formed with a sealing passageway for engaging a member to be supported by the grommet. The grommet has a base with a continuous circumferential and axially extending sealing surface and an opening-filling central convoluted portion which contains the passageway. The base is made with the resilient elastomeric material. A locking element of more rigid material is integrally molded to the base portion. However, the softer material of the base portion is extended into the interior of the locking element to allow it to flex as it is inserted through the opening in the panel. The locking element has a continuous circumferential and axially extending ridge portion which, at its end nearest the base, has a circumferential dimension slightly larger than the panel opening. The ridge, at its end nearest the base, also has substantially the same dimension as the sealing surface and preferably constitutes an axially extending continuation of the axially extending sealing surface. The sealing surface is also formed of the same harder material as the locking element. This provides for better wear of the grommet in service. When the grommet is installed in a panel opening, the locking element is inserted through the opening to a position on the opposite side of the panel from the base to lock the grommet in place with the sealing surface forming a complete seal continuously around the entire inner periphery of the panel opening. The central convoluted portion of the base permits radial and axial movement of the member supported in the passageway.

In a preferred form of the grommet, the base has an additional peripheral wing which extends outwardly and upwardly from the sealing surface so as to form a secondary seal by resilient pressure contact with the surface surrounding the opening when the plug is installed in the panel opening. The peripheral wing is also formed of the same harder material of the locking element to provide for better wear of the grommet in use.

The material forming the base will have a durometer hardness reading in the range of 20 to 90 Shore A, and the material forming the locking element, sealing surface and peripheral wing will have a durometer hardness in the range of 40 to 90 Shore D. Preferably, a thermoplastic material is used for both the soft base material and the harder locking element, sealing surface and peripheral wing material. Preferably the same basic material is used for both the base and the locking element to insure that they bond together in the molding process. Preferably this material is a polypropylene.

The present invention also embraces the grommet produced by the sequential and simultaneous injection molding process set forth in the description.

Other advantages and features of the invention will become apparent from the following description taken in conjunction with the accompanying drawings:

BRIEF DESCRIPTION OF THE DRAWINGS

FIG. 7 is a diagrammatic view illustrating the molding method employed in making the grommet;

FIG. 8 is an enlarged cross-sectional view along line 8—8 of FIG. 7 showing the initial injection molding step; and FIG. 9 is an enlarged cross-sectional view taken along line 9—9 of FIG. 7 showing the mold parts in position for performing the second injection molding step to provide the softer base member of the grommet.

DETAILED DESCRIPTION

Figure 1:
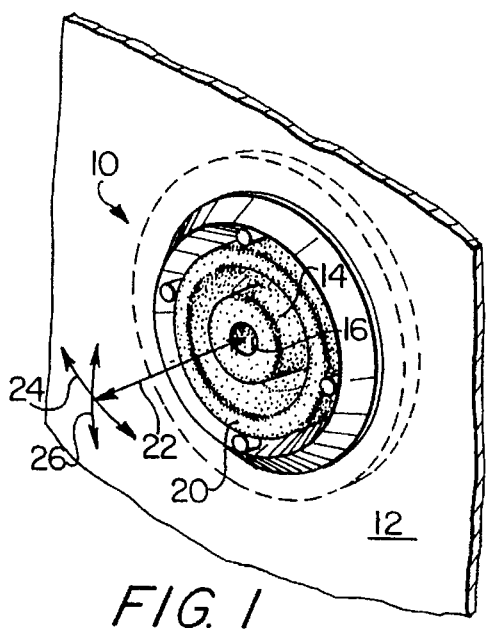
FIG. 1 is a perspective view of the grommet of this invention mounted in a panel and showing by arrows the manner in which the central passageway portion can be moved.
Figure 2:
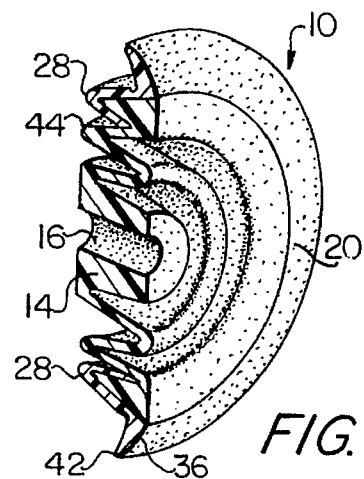
FIG. 2 is a perspective cross-sectional view of the grommet in FIG. 1 showing that the convoluted portion of the grommet and the central passageway forming portion are formed with a resilient elastomeric material and the annular locking element, annular sealing portion and peripheral wing are formed with a harder material.
Figure 6:
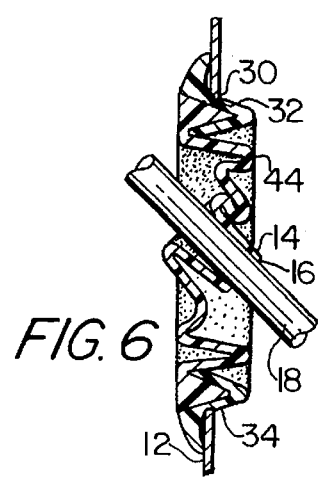
FIG. 6 is an elevational view in cross-section similar to FIG. 3 with a rod like member having been inserted into the central passageway of the grommet.

FIG. 1 shows the grommet 10 installed in a panel 12. A central boss 14 forms a passageway 16 for insertion of a member 18 to be held in the grommet, as seen in FIG. 6. Boss 14 is part of a resilient base 20 which permits movement in an axial direction as indicated by arrow 22 and in a universal tilting direction as indicated by arrows 24 and 26.

Figure 4:
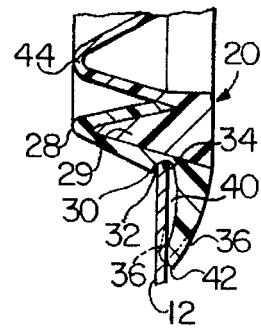
FIG. 4 is an enlarged, partial cross-sectional view of the encircled area in FIG. 3 showing how the resilient softer material of the grommet base is flexed to force the harder locking element, sealing portion and wing to sealingly engage the panel.
Figure 5:
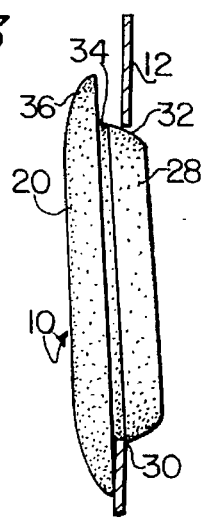
FIG. 5 is a view similar to FIG. 3 without the central portion extended showing the grommet of this invention being installed in a panel opening.

Grommet 10 has a harder or more rigid portion 28 in the form of an annular locking element or ridge which is tapered away from base 20 (FIG. 5). The largest dimension or diameter 30 of the locking element is larger than the aperture 32 into which the grommet is inserted, as best seen in FIGS. 5 and 6. As best seen in FIG. 4, an important feature of the present invention is that the softer material of base 20 extends axially into interior portion 29 of locking element 28. This permits locking element 28 to flex more easily through compression of the softer interior portion, facilitating the insertion of the locking element through the aperture 32 in panel 12. While grommet 10 is shown as being cylindrical or circular to be inserted in a circular hole or aperture 32, it will be appreciated that other configurations of the sealing perimeter such as a rectangular shape can be accommodated.

Base 20 has a continuous circumferential and axially extending sealing surface 34 which has substantially the same dimension as the ridge so that they constitute axially extending continuations of each other. Sealing surface 34 is made of the same harder or more rigid material as the harder portion of locking element 28. This feature provides for better wear of the grommet 10 in normal use as the harder sealing surface 38 will be more resistant to abrasion caused by frictional contact with the engaging surfaces of panel 12.

Base 20 has a peripheral flange or wing 36 which extends outwardly of locking element 28. Wing 36 not only extends axially outwardly of locking element 28 but also it is curved back in the direction of the locking element 28 forming a recess 40 (FIG. 4). Wing 36 forms a secondary seal as it is flexed from its as molded position shown at 36' in FIG. 4 by resilient pressure contact of its edge 42 with the panel surrounding its opening. Wing 36 is also made of the same harder or more rigid material as the harder portion of locking element 28. Again, this feature provides for better wear of the grommet 10 in service. Harder wing 36 will be more resistant to abrasion caused by frictional contact with the engaging surfaces of panel 12.

Figure 3:
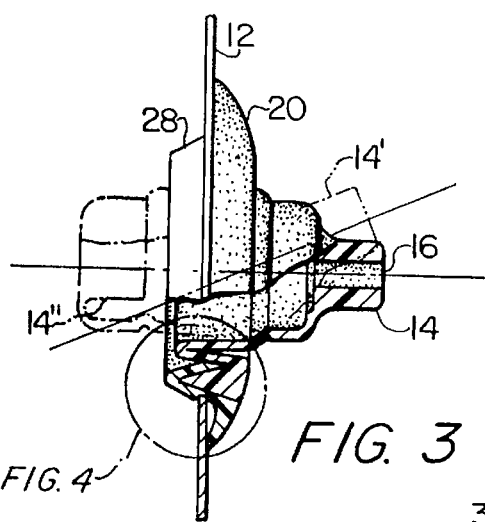
FIG. 3 is an elevational view partially in section showing the grommet installed in a panel with the central passageway portion or boss in an extended position, and also showing in phantom the degree to which the grommet can be flexed.

Central boss 14 of base 20 is joined to soft material portion 29 of locking element 28 by a flexible element 44 in the form of a convolution which permits tilting of boss 14 as shown in FIG. 3 at 14' in order to align passageway 16 with member 18 which is to pass through and be held by the grommet. This flexibility can be invaluable in situations where it is difficult or impossible to align this member at an angle perpendicular to the panel. Likewise, the flexible element or convolution 44 permits axial movement of central boss 14 to aid in installation of member 18 within the grommet. This axial movement can be to a considerable extent as shown by the movement of central boss 14 from the full line position to the right of panel 12 and shown in FIG. 3 to its position to the left of the panel as shown in phantom at 14". This allows not only the ease in initial installation, but permits axial movement of the member in use.

FIG. 5 illustrates how grommet 10 is installed into aperture 32 of panel 12. The grommet is tilted to allow a portion of the larger diameter ridge 30 to pass through aperture 32 so that the peripheral edge of the cutout contacts the axially extending sealing surface 34 of the grommet which yields so that the entire grommet can be snapped into aperture 32. The flexibility provided by softer portion 29 of locking element 28 eases this installation. Further, the expansion of the softer base material after the locking element 28 has been inserted into aperture 32 and expanded radially has the effect of urging edge 42 of wing 36 more tightly against the panel surface to enhance the secondary sealing therebetween.

FIG. 7 schematically illustrates the two stage injection molding process or method of manufacturing the grommet. At the first injection molding station 46 the harder or more rigid material portion of the grommet is injection molded comprising primarily annular locking element 28, sealing surface 34 and wing 36. The harder molded material H along with one of the mold halves is then transferred to the second injection molding station 48 where the softer material S is injection molded to bond with the harder material H. The softer material S includes all of base 20 components. When the second injection molding step is complete, the grommet is ejected from the mold and the transferred mold half is returned from second molding station 48 to first molding station 46 to repeat the process.

As seen in FIG. 8, first injection molding station 46 includes mold halves 50 and 52 which form the harder or more rigid material H of the grommet which includes annular locking element 28, sealing surface 34 and wing 36 when the material is injected from source 54. Mold half 50 is then transferred with the harder material H remaining in mold half 50 to second injection molding station 48 as seen in FIG. 9. When the mold half 56 is closed with mold half 50, the softer material S is injection molded from source 58 in mold cavity 60. When the molding process has been complete, and the grommet has been ejected, mold piece 50 is returned from second injection molding station 48 to first injection molding station 46 at the same time as another mold half 50 with its harder material H is transferred from first injection molding station 46 to second injection molding station 48.

As mentioned earlier, a variety of thermoplastic or thermosetting plastics can be used for the harder and softer materials. In order to accomplish the snap in installation and retention, the harder material H has a durometer hardness in the range of 40 to 90 Shore D, and the softer material has a durometer hardness in the range of 20 to 90 Shore A. A thermoplastic polypropylene resin can be formulated for both the harder and softer components of the grommet.

In the preferred embodiment of the invention, the annular locking element, sealing surface and wing are formed of a thermoplastic material and the base element is formed of a thermoplastic polyolefinic elastomer consisting of fully cured elastomer particles dispersed in a continuous thermoplastic matrix. The locking element sealing surface and wing may be formed either of a virgin polypropylene material or a polypropylene material provided with certain additives depending upon the specifications of the grommet. Fiberglass may be added to enhance the strength and rigidity of the material. Mica may be added to enhance rigidity to a greater extent but would have the added effect of reducing tensile and shear strength. The preferred durometer hardness of the locking element sealing surface and wing material is 65±5 Shore D.

The base element of the grommet preferably is formed of KRATON G or SANTOPRENE. KRATON G is a high performance thermoplastic polyolefinic elastomer manufactured and sold by the Shell Chemical Company of Houston, Tex. It is a styrene-ethylene/butylene-styrene (SEBS) block polymer that exhibits a high temperature, chemical, oxidation and weather resistance. SANTOPRENE is a high performance thermoplastic polyolefinic elastomer manufactured and sold by the Monsanto Polymer Products Company of Akron, Ohio. It is a fully vulcanized polyolefinic material produced by a proprietary vulcanization process by Monsanto. The specific hardness of the base element is dependent upon the specifications of the grommet. Durometer hardnesses of 35±5 Shore A and 55±5 Shore A for the base element have been used for different applications.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A grommet for sealing an opening in a panel and formed with a sealing passageway for engaging a member to be supported by the grommet comprising:

a base having a continuous circumferential and axially extending first surface thereon and an opening-filling central portion containing said passageway, said base being a resilient elastomeric material;

a locking element having a continuous circumferential and axially extending ridge with a circumferential dimension larger than said opening, and said ridge having substantially the same dimension as said first surface constituting a continuation of said first surface and forming an axially extending first sealing surface, said locking element comprising a harder material than said base, integrally molded to said base;

wherein said softer base material extends axially into a softer interior portion of said locking element; and wherein when said grommet is installed in a panel opening, the locking element is inserted through the opening and flexes through compression of said softer interior portion to a position on the opposite side of the panel from the base, locking the grommet in place, said axially extending first sealing surface forming a complete seal continuously around the entire inner periphery of the panel opening.

2. The grommet according to claim 1 including a peripheral wing extending outwardly of said locking element forming a second sealing surface by resilient pressure contact with the surface surrounding said opening when said grommet is installed in a panel opening, and wherein said wing is formed of a harder material than said base, integrally molded to said base.

3. The grommet assembly according to claim 2 wherein the material forming said base has a durometer hardness reading in the range of 20 to 90 Shore A and the material forming said locking element and said wing has a durometer hardness in the range of 40 to 90 Shore D.

4. The grommet assembly according to claim 1 wherein the material forming said base has a durometer hardness reading in the range of 20 to 90 Shore A and the material forming said locking element has a durometer hardness in the range of 40 to 90 Shore D.

5. The grommet assembly according to claim 1 wherein the material forming said base and said locking element includes a majority of the same thermoplastic material.

6. The grommet assembly according to claim 5 wherein said thermoplastic material is polypropylene.

7. A grommet for sealing an opening in a panel and formed with a sealing passageway for engaging a member to be supported by the grommet comprising:

a base having continuous circumferential and axially extending first surface thereon and an opening-filling central portion containing said passageway, said base being a resilient elastomeric material;

a locking element having a continuous circumferential and axially extending ridge with circumferential dimension larger than said opening, and said ridge having substantially the same dimension as said first surface constituting a continuation of said first surface and forming an axially extending first sealing surface, said locking element comprising a harder material than said base, integrally molded into said base;

a peripheral wing extending outwardly of said locking element forming a second sealing surface by resilient pressure contact with the surface surrounding said opening when said grommet is installed in a panel opening, and wherein said wing is formed of a harder material than said base, integrally molded to said base;

wherein said softer base material extends axially into a softer interior portion of said locking element; and wherein said grommet is installed in a panel opening, the locking element is inserted through the opening and flexes through compression of said softer interior portion to a position on the opposite side of the panel from the base, locking the grommet in place, said axially extending first sealing surface forming a complete seal continuously around the entire inner periphery of the panel opening.

8. A grommet for sealing an opening in a panel and formed with a sealing passageway for engaging a member to be supported by the grommet comprising:

a base having continuous circumferential and axially extending first surface thereon and an opening-filling central portion containing said passageway, said base being a resilient elastomeric material;

a locking element having a continuous circumferential and axially extending ridge with a circumferential dimension larger than said opening, and said ridge having substantially the same dimension as said first surface constituting a continuation of said first surface and forming an axially extending first sealing surface, said locking element comprising a harder material than said base integrally molded to said base;

a peripheral wing extending outwardly of said locking element forming a second sealing surface by resilient pressure contact with the surface surrounding said opening when said grommet is installed in a panel opening, and wherein said wing is formed of a harder material than said base, integrally molded to said base;

wherein said softer base material extends axially into a softer interior portion of said locking element;

wherein said grommet is installed in a panel opening, the locking element is inserted through the opening and flexes through compression of said softer interior portion to a position on the opposite side of the panel from the base, locking the grommet in place, said axially extending first sealing surface forming a complete seal continuously around the entire inner periphery of the panel opening;

wherein the material forming said base has a durometer hardness reading in the range of 20 to 90 Shore A and the material forming said locking element and said wing has a durometer hardness in the range of 40 to 90 Shore D.

\* \* \* \* \*